United States Patent
Asano

(10) Patent No.: US 11,011,754 B2
(45) Date of Patent: May 18, 2021

(54) BINDER COMPOSITION FOR NON-AQUEOUS SECONDARY BATTERY FUNCTIONAL LAYER, COMPOSITION FOR NON-AQUEOUS SECONDARY BATTERY FUNCTIONAL LAYER, FUNCTIONAL LAYER FOR NON-AQUEOUS SECONDARY BATTERY, BATTERY MEMBER FOR NON-AQUEOUS SECONDARY BATTERY, AND NON-AQUEOUS SECONDARY BATTERY

(71) Applicant: ZEON CORPORATION, Tokyo (JP)

(72) Inventor: Junichi Asano, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 83 days.

(21) Appl. No.: 16/091,653

(22) PCT Filed: Apr. 18, 2017

(86) PCT No.: PCT/JP2017/015611
§ 371 (c)(1),
(2) Date: Oct. 5, 2018

(87) PCT Pub. No.: WO2017/183641
PCT Pub. Date: Oct. 26, 2017

(65) Prior Publication Data
US 2019/0157680 A1    May 23, 2019

(30) Foreign Application Priority Data

Apr. 19, 2016  (JP) ............................. JP2016-083984

(51) Int. Cl.
| | |
|---|---|
| H01M 4/62 | (2006.01) |
| H01M 10/0525 | (2010.01) |
| H01M 4/13 | (2010.01) |
| H01M 50/409 | (2021.01) |
| H01M 4/04 | (2006.01) |
| H01M 4/1391 | (2010.01) |
| H01M 10/058 | (2010.01) |

(52) U.S. Cl.
CPC .......... *H01M 4/623* (2013.01); *H01M 4/0404* (2013.01); *H01M 4/13* (2013.01); *H01M 4/1391* (2013.01); *H01M 4/62* (2013.01); *H01M 50/409* (2021.01); *H01M 10/058* (2013.01); *H01M 10/0525* (2013.01)

(58) Field of Classification Search
CPC ...... H01M 4/623; H01M 4/0404; H01M 4/13; H01M 4/1391; H01M 4/62; H01M 2/16; H01M 10/0525; H01M 10/058; H01M 50/409

See application file for complete search history.

(56) References Cited

U.S. PATENT DOCUMENTS

| | | | |
|---|---|---|---|
| 2013/0202963 A1* | 8/2013 | Kim .................. | C08F 212/36 429/217 |
| 2014/0147726 A1 | 5/2014 | Toyoda et al. | |

FOREIGN PATENT DOCUMENTS

| | | |
|---|---|---|
| CN | 105378989 A | 3/2016 |
| EP | 3457456 A1 | 3/2019 |
| EP | 3457457 A1 | 3/2019 |
| JP | 2013145763 A | 7/2013 |
| JP | 2015118908 A | 6/2015 |
| WO | 2013005796 A1 | 1/2013 |

OTHER PUBLICATIONS

EPO machine generated English translation of JP 2015-118908 (Year: 2015).*
Oct. 23, 2018, International Preliminary Report on Patentability issued in the International Patent Application No. PCT/JP2017/015611.
Nov. 22, 2019, the Extended European Search Report issued by the European Patent Office in the corresponding European Patent Application No. 17785979.0.
Dec. 1, 2020, Communication pursuant to Rule 114(2) EPC issued by the European Patent Office in the corresponding European Patent Application No. 17785979.0.

* cited by examiner

*Primary Examiner* — Christopher P Domone
*Assistant Examiner* — Kimberly Wyluda
(74) *Attorney, Agent, or Firm* — Kenja IP Law PC

(57) ABSTRACT

Provided is a binder composition for a non-aqueous secondary battery functional layer that enables production of a composition for a non-aqueous secondary battery functional layer that has excellent stability and can cause a non-aqueous secondary battery to display excellent cycle characteristics. The binder composition contains a water-soluble polymer and water. The water-soluble polymer has a contact angle with water of at least 40° and not more than 80° and has a degree of swelling in electrolyte solution of more than a factor of 1.0 and not more than a factor of 3.0.

8 Claims, No Drawings

BINDER COMPOSITION FOR NON-AQUEOUS SECONDARY BATTERY FUNCTIONAL LAYER, COMPOSITION FOR NON-AQUEOUS SECONDARY BATTERY FUNCTIONAL LAYER, FUNCTIONAL LAYER FOR NON-AQUEOUS SECONDARY BATTERY, BATTERY MEMBER FOR NON-AQUEOUS SECONDARY BATTERY, AND NON-AQUEOUS SECONDARY BATTERY

TECHNICAL FIELD

The present disclosure relates to a binder composition for a non-aqueous secondary battery functional layer, a composition for a non-aqueous secondary battery functional layer, a functional layer for a non-aqueous secondary battery, a battery member for a non-aqueous secondary battery, and a non-aqueous secondary battery.

BACKGROUND

Non-aqueous secondary batteries (hereinafter, also referred to simply as "secondary batteries"), such as lithium ion secondary batteries, have characteristics such as compact size, light weight, high energy density, and the ability to be repeatedly charged and discharged, and are used in a wide variety of applications. A non-aqueous secondary battery generally includes battery members such as a positive electrode, a negative electrode, and a separator that isolates the positive electrode and the negative electrode from one another and prevents short circuiting between the positive and negative electrodes.

Battery members including functional layers for imparting desired performance (for example, heat resistance and strength) on the battery members are currently used in secondary batteries. Specific examples of such battery members that are being used include a separator obtained by forming a functional layer on a separator substrate and an electrode obtained by forming a functional layer on an electrode substrate in which an electrode mixed material layer is disposed on a current collector. Moreover, in one used example of a functional layer that can improve heat resistance, strength, and the like of a battery member, the functional layer is composed by a porous membrane layer formed by binding non-conductive particles using a binder (binding material). This functional layer is formed, for example, by applying a composition for a functional layer containing non-conductive particles, a binder, and a dispersion medium onto a substrate (for example, a separator substrate or an electrode substrate), and then drying the applied composition for a functional layer.

Compositions for functional layers in which an aqueous medium is used as a dispersion medium have attracted increased interest in recent years from a viewpoint of environmental impact and the like. Techniques have been proposed in which a water-soluble polymer is used as a component, such as a binder, in an aqueous composition for a functional layer such as mentioned above.

In one specific example, PTL 1 proposes a technique for increasing close adherence between a protective film and a separator substrate and improving charge/discharge characteristics of a power storage device by forming the protective film using a slurry for a protective film containing: a water-soluble polymer including 40 mass % to 100 mass % of a (meth)acrylamide monomer unit; a compound including at least one selected from the group consisting of unsaturated carboxylic acids, unsaturated amides, and salts thereof; a filler; and water.

In another example, PTL 2 proposes a technique for increasing close adherence between a porous membrane and a separator substrate by forming the porous membrane using a slurry composition for a porous membrane containing: a water-soluble polymer including 15 weight % to 50 weight % of an ethylenically unsaturated carboxylic acid monomer unit, 30 weight % to 80 weight % of a (meth)acrylic acid ester monomer unit, and 0.5 weight % to 10 weight % of a fluorine-containing (meth)acrylic acid ester monomer unit; non-conductive particles; and water.

CITATION LIST

Patent Literature

PTL 1: JP 2015-118908 A
PTL 2: WO 2013/005796 A1

SUMMARY

Technical Problem

However, in regard to the conventional water-soluble polymer-containing compositions for functional layers described above, further enhancement is desired for functional layer productivity and improvement of secondary battery performance.

In the case of the composition for a functional layer described in PTL 1, there is demand for causing a secondary battery to display even better cycle characteristics, for example. Specifically, when the composition for a functional layer described in PTL 1 has been dried to form a functional layer, it has not been possible to sufficiently remove water from the functional layer, which is presumed to be a consequence of the water-soluble polymer being highly hydrophilic. Accordingly, when a functional layer obtained using the composition for a functional layer described in PTL 1 is used, there is a problem that electrolyte solution decomposition and gas generation occur due to residual water in the functional layer, and secondary battery cycle characteristics deteriorate.

Moreover, in the case of the composition for a functional layer described in PTL 2, there is demand for higher composition stability, for example. Specifically, in a situation in which the composition for a functional layer is applied onto a substrate using a gravure coating apparatus, for example, in order to form a functional layer on the substrate, shear force is imparted on the composition for a functional layer through rotation of a gravure roll. However, dispersion stability of the composition for a functional layer described in PTL 2 when shear force is imparted thereon cannot be said to be of a satisfactory level. Accordingly, in a situation in which the composition for a functional layer described in PTL 2 is applied over a long time or in which the rotation speed of a gravure roll is increased to allow high-speed application, there is a problem that components contained in the composition aggregate, making it difficult to obtain a functional layer of uniform thickness.

In other words, there is room for improvement in the conventional techniques described above in terms of increasing stability of a composition for a functional layer and improving cycle characteristics of a secondary battery.

Accordingly, an objective of the present disclosure is to provide a binder composition for a non-aqueous secondary battery functional layer that enables production of a composition for a non-aqueous secondary battery functional layer that has excellent stability and can cause a non-aqueous secondary battery to display excellent cycle characteristics.

Another objective of the present disclosure is to provide a composition for a non-aqueous secondary battery functional layer that has excellent stability and can cause a non-aqueous secondary battery to display excellent cycle characteristics.

Yet another objective of the present disclosure is to provide a functional layer for a non-aqueous secondary battery and a battery member for a non-aqueous secondary battery that can cause a non-aqueous secondary battery to display excellent cycle characteristics, and a non-aqueous secondary battery including the functional layer for a non-aqueous secondary battery.

Solution to Problem

The inventor conducted diligent investigation with the aim of solving the problems set forth above. Through this investigation, the inventor discovered that a composition for a functional layer having excellent stability can be produced using a binder composition that contains a water-soluble polymer having a contact angle with water and a degree of swelling in electrolyte solution that are each within a specific range, and that a secondary battery can be caused to display excellent cycle characteristics through a functional layer formed using the composition for a functional layer containing this binder composition. In this manner, the inventor completed the present disclosure.

Specifically, the present disclosure aims to advantageously solve the problems set forth above by disclosing a binder composition for a non-aqueous secondary battery functional layer comprising a water-soluble polymer and water, wherein the water-soluble polymer has a contact angle with water of at least 40° and not more than 80°, and the water-soluble polymer has a degree of swelling in electrolyte solution of more than a factor of 1.0 and not more than a factor of 3.0. Through use of a binder composition containing a water-soluble polymer that has a contact angle with water of at least 40° and not more than 80° and a degree of swelling in electrolyte solution of more than a factor of 1.0 and not more than a factor of 3.0 as set forth above, a composition for a functional layer having excellent stability can be prepared and a functional layer that can cause a secondary battery to display excellent cycle characteristics can be produced.

The term "water-soluble polymer" as used in the present disclosure refers to a polymer for which insoluble content is less than 1.0 mass % when 0.5 g of the polymer is dissolved in 100 g of water at a temperature of 25° C. Moreover, the "contact angle with water" of the "water-soluble polymer" and the "degree of swelling in electrolyte solution" of the "water-soluble polymer" referred to in the present disclosure can be measured by methods described in the EXAMPLES section of the present specification.

In the presently disclosed binder composition for a non-aqueous secondary battery functional layer, the water-soluble polymer preferably includes at least 0.1 mass % and not more than 20 mass % of a fluorine-containing (meth)acrylic acid ester monomer unit. When the water-soluble polymer includes a fluorine-containing (meth)acrylic acid ester monomer unit within the range set forth above, the residual water content in a functional layer can be reduced to further improve secondary battery cycle characteristics, and functional layer peel strength and secondary battery output characteristics can be improved. Moreover, when the water-soluble polymer includes a fluorine-containing (meth)acrylic acid ester monomer unit within the range set forth above, stability of a composition for a functional layer can be further increased.

In the present disclosure, "(meth)acryl" is used to indicate "acryl" and/or "methacryl". Moreover, the phrase "includes a monomer unit" as used in the present disclosure means that "a polymer obtained with the monomer includes a structural unit (repeating unit) derived from the monomer".

In the presently disclosed binder composition for a non-aqueous secondary battery functional layer, the water-soluble polymer preferably includes at least 70 mass % and not more than 95 mass % of a (meth)acrylamide monomer unit. When the water-soluble polymer includes a (meth)acrylamide monomer unit within the range set forth above, stability of a composition for a functional layer can be further increased and durability of a functional layer in electrolyte solution can be improved to cause a secondary battery to display even better cycle characteristics.

In the presently disclosed binder composition for a non-aqueous secondary battery functional layer, the water-soluble polymer preferably includes at least 0.1 mass % and not more than 1.0 mass % of a crosslinkable monomer unit. When the water-soluble polymer includes a crosslinkable monomer unit within the range set forth above, secondary battery output characteristics can be improved and durability of a functional layer in electrolyte solution can be improved to cause a secondary battery to display even better cycle characteristics.

In the presently disclosed binder composition for a non-aqueous secondary battery functional layer, the water-soluble polymer preferably has a weight average molecular weight of at least 100,000 and not more than 10,000,000. When the weight average molecular weight of the water-soluble polymer is within the range set forth above, stability of a composition for a functional layer can be further increased and secondary battery output characteristics can be improved.

Note that in the present disclosure, the "weight average molecular weight" of the "water-soluble polymer" refers to poly(ethylene oxide) equivalent weight average molecular weight measured by gel permeation chromatography using 0.1 M $NaNO_3$ aqueous solution as an eluent.

Moreover, the present disclosure aims to advantageously solve the problems set forth above by disclosing a composition for a non-aqueous secondary battery functional layer comprising non-conductive particles and any of the binder compositions for a non-aqueous secondary battery functional layer set forth above. A composition for a functional layer containing non-conductive particles and any of the binder compositions set forth above has excellent stability and can be used to form a functional layer that can cause a secondary battery to display excellent cycle characteristics.

Furthermore, the present disclosure aims to advantageously solve the problems set forth above by disclosing a functional layer for a non-aqueous secondary battery formed using the composition for a non-aqueous secondary battery functional layer set forth above. A functional layer formed using the composition for a functional layer set forth above can cause a secondary battery to display excellent cycle characteristics.

Also, the present disclosure aims to advantageously solve the problems set forth above by disclosing a battery member for a non-aqueous secondary battery comprising the functional layer for a non-aqueous secondary battery set forth above. A battery member including the functional layer for a non-aqueous secondary battery set forth above can cause a secondary battery to display excellent cycle characteristics.

Moreover, the present disclosure aims to advantageously solve the problems set forth above by disclosing a non-aqueous secondary battery comprising the functional layer for a non-aqueous secondary battery set forth above. A secondary battery including the functional layer set forth above has excellent battery characteristics such as cycle characteristics.

Advantageous Effect

According to the present disclosure, it is possible to provide a binder composition for a non-aqueous secondary battery functional layer that enables production of a composition for a non-aqueous secondary battery functional layer that has excellent stability and can cause a non-aqueous secondary battery to display excellent cycle characteristics.

Moreover, according to the present disclosure, it is possible to provide a composition for a non-aqueous secondary battery functional layer that has excellent stability and can cause a non-aqueous secondary battery to display excellent cycle characteristics.

Furthermore, according to the present disclosure, it is possible to provide a functional layer for a non-aqueous secondary battery and a battery member for a non-aqueous secondary battery that can cause a non-aqueous secondary battery to display excellent cycle characteristics, and a non-aqueous secondary battery including the functional layer for a non-aqueous secondary battery.

DETAILED DESCRIPTION

The following provides a detailed description of embodiments of the present disclosure.

A presently disclosed binder composition for a non-aqueous secondary battery functional layer is used as a material in production of a composition for a non-aqueous secondary battery functional layer. Moreover, a presently disclosed composition for a non-aqueous secondary battery functional layer is produced using the presently disclosed binder composition for a non-aqueous secondary battery functional layer and non-conductive particles. Furthermore, a presently disclosed functional layer for a non-aqueous secondary battery is formed using the presently disclosed composition for a non-aqueous secondary battery functional layer. Also, a presently disclosed battery member for a non-aqueous secondary battery includes at least the presently disclosed functional layer for a non-aqueous secondary battery. Moreover, a presently disclosed non-aqueous secondary battery includes the presently disclosed functional layer for a non-aqueous secondary battery.

(Binder Composition for Non-Aqueous Secondary Battery Functional Layer)

The presently disclosed binder composition for a non-aqueous secondary battery functional layer is an aqueous composition that contains a water-soluble polymer and water serving as a solvent, and may optionally further contain other components. A feature of the presently disclosed binder composition for a non-aqueous secondary battery functional layer is that a polymer having a contact angle with water of at least 40° and not more than 80° and a degree of swelling in electrolyte solution of more than a factor of 1.0 and not more than a factor of 3.0 is used as the water-soluble polymer.

When the presently disclosed binder composition for a non-aqueous secondary battery functional layer is used in production of a composition for a functional layer, stability of the composition for a functional layer can be increased and a functional layer of uniform thickness can be formed. Moreover, when a composition for a functional layer containing the presently disclosed binder composition for a non-aqueous secondary battery functional layer is used in formation of a functional layer, residual water content in the functional layer can be reduced and durability of the functional layer in electrolyte solution can be improved. Therefore, battery characteristics (for example, cycle characteristics) of a secondary battery can be improved when the presently disclosed binder composition for a non-aqueous secondary battery functional layer is used.

Although it is not clear why the above-described effects are obtained through use of the presently disclosed binder composition, the reason for these effects is presumed to be as follows.

Specifically, the water-soluble polymer contained in the presently disclosed binder composition has a contact angle with water of 80° or less and retains sufficient hydrophilicity. Consequently, the water-soluble polymer can sufficiently dissolve in an aqueous composition for a functional layer and can increase stability of the composition for a functional layer. On the other hand, the water-soluble polymer has a contact angle with water of 40° or more and also has excellent water separability while retaining sufficient hydrophilicity as mentioned above. This allows efficient water removal when the composition for a functional layer is dried to form a functional layer.

Moreover, the water-soluble polymer contained in the presently disclosed binder composition has a degree of swelling in electrolyte solution of more than a factor of 1.0 and affinity of the water-soluble polymer with electrolyte solution is ensured. On the other hand, the water-soluble polymer has a degree of swelling in electrolyte solution of a factor of 3.0 or less and does not excessively swell in electrolyte solution. Consequently, a functional layer obtained using the presently disclosed binder composition displays excellent durability in electrolyte solution because elution of the water-soluble polymer into the electrolyte solution is inhibited.

A secondary battery having excellent battery characteristics such as cycle characteristics can, therefore, be obtained using the presently disclosed binder composition.

<Water-Soluble Polymer>

The water-soluble polymer contained as a binder in the presently disclosed binder composition for a non-aqueous secondary battery functional layer has a contact angle with water of at least 40° and not more than 80° and a degree of swelling in electrolyte solution of more than a factor of 1.0 and not more than a factor of 3.0.

[Properties of Water-Soluble Polymer]

—Contact Angle with Water—

The contact angle of the water-soluble polymer with water is required to be at least 40° and not more than 80°, is preferably 45° or more, more preferably 50° or more, and even more preferably 51° or more, and is preferably 75° or less, more preferably 70° or less, and even more preferably 67° or less. Water separability of the water-soluble polymer cannot be ensured if the contact angle of the water-soluble polymer with water is less than the lower limit set forth above. This results in an increase in residual water content in a functional layer and deterioration of secondary battery cycle characteristics. On the other hand, hydrophilicity of the water-soluble polymer decreases and stability of a composition for a functional layer cannot be ensured if the contact angle of the water-soluble polymer with water is more than the upper limit set forth above. The contact angle with water can be adjusted by, for example, altering the make-up or the weight average molecular weight of the water-soluble polymer. Specifically, the contact angle with water can be reduced by increasing the percentage content of a (meth)acrylamide monomer unit and/or a hydrophilic group-containing monomer unit in the water-soluble polymer and can be increased by increasing the percentage content of a fluorine-containing (meth)acrylic acid ester monomer unit in the water-soluble polymer. Moreover, the contact angle with water can be reduced by reducing the weight average molecular weight of the water-soluble polymer and can be increased by increasing the weight average molecular weight of the water-soluble polymer.

—Degree of Swelling in Electrolyte Solution—

The degree of swelling of the water-soluble polymer in electrolyte solution is required to be more than a factor of 1.0 and not more than a factor of 3.0, is preferably a factor of 1.1 or more, more preferably a factor of 1.3 or more, and even more preferably a factor of 1.5 or more, and is preferably a factor of 2.5 or less, and more preferably a factor of 2.0 or less. Affinity of the water-soluble polymer with electrolyte solution cannot be ensured and battery characteristics such as output characteristics deteriorate if the degree of swelling of the water-soluble polymer in electrolyte solution is a factor of 1.0 or less. On the other hand, elution of the water-soluble polymer into electrolyte solution cannot be inhibited and functional layer durability in electrolyte solution decreases if the degree of swelling of the water-soluble polymer in electrolyte solution is more than the upper limit set forth above. Consequently, a secondary battery cannot be caused to display excellent cycle characteristics. The degree of swelling in electrolyte solution can be adjusted by, for example, altering the make-up of the water-soluble polymer. Specifically, the degree of swelling in electrolyte solution can be reduced by increasing the percentage content of a (meth)acrylamide monomer unit and/or a crosslinkable monomer unit in the water-soluble polymer and can be increased by reducing the percentage content of a (meth)acrylamide monomer unit and/or a crosslinkable monomer unit in the water-soluble polymer.

—Weight Average Molecular Weight—

The weight average molecular weight of the water-soluble polymer is preferably 100,000 or more, more preferably 300,000 or more, and even more preferably 500,000 or more, and is preferably 10,000,000 or less, more preferably 5,000,000 or less, and even more preferably 2,000,000 or less. Viscosity of the water-soluble polymer increases and stability of a composition for a functional layer can be further improved when the weight average molecular weight of the water-soluble polymer is at least any of the lower limits set forth above. On the other hand, affinity of the water-soluble polymer with electrolyte solution increases and battery characteristics such as output characteristics can be improved when the weight average molecular weight of the water-soluble polymer is not more than any of the upper limits set forth above.

[Make-Up of Water-Soluble Polymer]

No specific limitations are placed on the make-up of the water-soluble polymer. In one example, the water-soluble polymer may include a fluorine-containing (meth)acrylic acid ester monomer unit, a (meth)acrylamide monomer unit, a crosslinkable monomer unit, and other monomer units.

—Fluorine-Containing (meth)acrylic Acid Ester Monomer Unit—

Examples of fluorine-containing (meth)acrylic acid ester monomers that can form a fluorine-containing (meth)acrylic acid ester monomer unit include monomers represented by the following formula (I).

$R^1$ in formula (I) represents a hydrogen atom or a methyl group.

$R^2$ in formula (I) represents a fluorine atom-containing hydrocarbon group. The carbon number of the hydrocarbon group is normally at least 1 and not more than 18. The number of fluorine atoms included in $R^2$ may be one, or may be two or more.

Examples of fluorine-containing (meth)acrylic acid ester monomers represented by formula (I) include fluoroalkyl (meth)acrylates, fluoroaryl (meth)acrylates, and fluoroaralkyl (meth)acrylates. Of these fluorine-containing (meth) acrylic acid ester monomers, fluoroalkyl (meth)acrylates are preferable. Specific examples of monomers such as described above include perfluoroalkyl esters of (meth) acrylic acid such as 2,2,2-trifluoroethyl (meth)acrylate, β-(perfluorooctyl)ethyl (meth)acrylate, 2,2,3,3-tetrafluoropropyl (meth)acrylate, 2,2,3,4,4,4-hexafluorobutyl (meth) acrylate, 1H,1H,9H-perfluoro-1-nonyl (meth)acrylate, 1H,1H,11H-perfluoroundecyl (meth)acrylate, perfluorooctyl (meth)acrylate, trifluoromethyl (meth)acrylate, and 3[4[1-trifluoromethyl-2,2-bis[bis(trifluoromethyl)fluoromethyl] ethynyloxy]benzooxy]2-hydroxypropyl (meth)acrylate. One of these monomers may be used individually, or a plurality of these monomers may be used in combination. Of these monomers, 2,2,2-trifluoroethyl (meth)acrylate is preferable, and 2,2,2-trifluoroethyl methacrylate is more preferable.

The proportion in which the fluorine-containing (meth) acrylic acid ester monomer unit is included in the water-soluble polymer when the amount of all monomer units is taken to be 100 mass % is preferably 0.1 mass % or more, more preferably 0.2 mass % or more, and even more preferably 0.3 mass % or more, and is preferably 20 mass % or less, more preferably 10 mass % or less, and even more preferably 5.0 mass % or less. Water separability of the water-soluble polymer can be increased when the proportion in which the fluorine-containing (meth)acrylic acid ester monomer unit is included in the water-soluble polymer is at least any of the lower limits set forth above. As a consequence, residual water content in a functional layer can be reduced and cycle characteristics of a secondary battery can be further improved. Moreover, stability of a composition for a functional layer can be further increased and output characteristics of a secondary battery can be improved when the proportion in which the fluorine-containing (meth) acrylic acid ester monomer unit is included in the water-soluble polymer is at least any of the lower limits set forth above. On the other hand, affinity of the water-soluble polymer with electrolyte solution can be increased and battery characteristics such as output characteristics can be improved when the proportion in which the fluorine-containing (meth)acrylic acid ester monomer unit is included in the water-soluble polymer is not more than any of the upper limits set forth above. In addition, adhesion strength of a functional layer and a substrate (i.e., peel strength of a functional layer) can be ensured.

—(Meth)acrylamide Monomer Unit—

Examples of (meth)acrylamide monomers that can form a (meth)acrylamide monomer unit include acrylamide and methacrylamide. One of these monomers may be used individually, or a plurality of these monomers may be used in combination. Of these (meth)acrylamide monomers, acrylamide is preferable.

The proportion in which the (meth)acrylamide monomer unit is included in the water-soluble polymer when the amount of all monomer units is taken to be 100 mass % is preferably 70 mass % or more, more preferably 75 mass % or more, and even more preferably 80 mass % or more, and is preferably 95 mass % or less, more preferably 92 mass % or less, and even more preferably 90 mass % or less. Hydrophilicity of the water-soluble polymer increases and stability of a composition for a functional layer can be further improved when the proportion in which the (meth)acrylamide monomer unit is included in the water-soluble polymer is at least any of the lower limits set forth above. On the other hand, elution of the water-soluble polymer into electrolyte solution can be inhibited and durability of a functional layer in electrolyte solution can be increased when the proportion in which the (meth)acrylamide monomer unit is included in the water-soluble polymer is not more than any of the upper limits set forth above. Consequently, cycle characteristics of a secondary battery can be further improved.

—Crosslinkable Monomer Unit—

Examples of crosslinkable monomers that can form a crosslinkable monomer unit include monomers that can form a crosslinked structure through polymerization without any specific limitations. A typical example of a crosslinkable monomer is a monomer that is thermally crosslinkable. More specific examples include a crosslinkable monomer having a thermally crosslinkable group and one olefinic double bond per molecule and a crosslinkable monomer having two or more olefinic double bonds per molecule.

Examples of thermally crosslinkable groups include an epoxy group, an N-methylol amide group, an oxetanyl group, an oxazoline group, and combinations thereof. Of these thermally crosslinkable groups, an epoxy group is preferable in terms of ease with which crosslinking and crosslink density can be adjusted.

Examples of crosslinkable monomers having an epoxy group as a thermally crosslinkable group and having an olefinic double bond include unsaturated glycidyl ethers such as vinyl glycidyl ether, allyl glycidyl ether, butenyl glycidyl ether, and o-allylphenyl glycidyl ether; monoepoxides of dienes and polyenes such as butadiene monoepoxide, chloroprene monoepoxide, 4,5-epoxy-2-pentene, 3,4-epoxy-1-vinylcyclohexene, and 1,2-epoxy-5,9-cyclododecadiene; alkenyl epoxides such as 3,4-epoxy-1-butene, 1,2-epoxy-5-hexene, and 1,2-epoxy-9-decene; and glycidyl esters of unsaturated carboxylic acids such as glycidyl acrylate, glycidyl methacrylate, glycidyl crotonate, glycidyl 4-heptenoate, glycidyl sorbate, glycidyl linoleate, glycidyl 4-methyl-3-pentenoate, glycidyl ester of 3-cyclohexenecarboxylic acid, and glycidyl ester of 4-methyl-3-cyclohexenecarboxylic acid.

Examples of crosslinkable monomers having an N-methylol amide group as a thermally crosslinkable group and having an olefinic double bond include (meth)acrylamides having a methylol group such as N-methylol(meth)acrylamide.

Examples of crosslinkable monomers having an oxetanyl group as a thermally crosslinkable group and having an olefinic double bond include 3-((meth)acryloyloxymethyl)oxetane, 3-((meth)acryloyloxymethyl)-2-trifluoromethyloxetane, 3-((meth)acryloyloxymethyl)-2-phenyloxetane, 2-((meth)acryloyloxymethyl)oxetane, and 2-((meth)acryloyloxymethyl)-4-trifluoromethyloxetane.

In the present disclosure, "(meth)acryloyl" indicates "acryloyl" and/or "methacryloyl".

Examples of crosslinkable monomers having an oxazoline group as a thermally crosslinkable group and having an olefinic double bond include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, 2-isopropenyl-5-methyl-2-oxazoline, and 2-isopropenyl-5-ethyl-2-oxazoline.

Examples of crosslinkable monomers having two or more olefinic double bonds per molecule include allyl (meth)acrylate, ethylene di(meth)acrylate, diethylene glycol di(meth)acrylate, triethylene glycol di(meth)acrylate, tetraethylene glycol di(meth)acrylate, trimethylolpropane-tri(meth)acrylate, dipropylene glycol diallyl ether, polyglycol diallyl ether, triethylene glycol divinyl ether, hydroquinone diallyl ether, tetraallyloxyethane, trimethylolpropane-diallyl ether, allyl and vinyl ethers of multifunctional alcohols other than those listed above, triallylamine, methylene bisacrylamide, and divinyl benzene.

One of these crosslinkable monomers may be used individually, or a plurality of these crosslinkable monomers may be used in combination. Of these crosslinkable monomers, crosslinkable monomers having two or more olefinic double bonds per molecule are preferable, allyl (meth)acrylate is more preferable, and allyl methacrylate is even more preferable.

The proportion in which the crosslinkable monomer unit is included in the water-soluble polymer when the amount of all monomer units is taken to be 100 mass % is preferably 0.1 mass % or more, more preferably 0.15 mass % or more, and even more preferably 0.2 mass % or more, and is preferably 1.0 mass % or less, more preferably 0.7 mass % or less, and even more preferably 0.5 mass % or less. Elution of the water-soluble polymer into electrolyte solution can be inhibited and durability of a functional layer in electrolyte solution can be increased when the proportion in which the crosslinkable monomer unit is included in the water-soluble polymer is at least any of the lower limits set forth above. Consequently, cycle characteristics of a secondary battery can be further improved. On the other hand, affinity of the water-soluble polymer with electrolyte solution increases and battery characteristics such as output characteristics can be improved when the proportion in which the crosslinkable monomer unit is included in the water-soluble polymer is not more than any of the upper limits set forth above.

—Other Monomer Units—

Examples of monomer units other than the fluorine-containing (meth)acrylic acid ester monomer unit, the (meth)acrylamide monomer unit, and the crosslinkable monomer unit set forth above include, but are not specifically limited to, a hydrophilic group-containing monomer unit and an aromatic vinyl monomer unit.

Examples of hydrophilic group-containing monomers that can form a hydrophilic group-containing monomer unit include polymerizable monomers having a hydrophilic group. Specific examples of hydrophilic group-containing monomers that may be used include carboxylic acid group-containing monomers, sulfonate group-containing monomers, phosphate group-containing monomers, and hydroxy group-containing monomers.

Examples of carboxylic acid group-containing monomers include monocarboxylic acids, derivatives of monocarboxylic acids, dicarboxylic acids, acid anhydrides of dicarboxylic acids, and derivatives of dicarboxylic acids and acid anhydrides thereof.

Examples of monocarboxylic acids include acrylic acid, methacrylic acid, and crotonic acid.

Examples of monocarboxylic acid derivatives include 2-ethylacrylic acid, isocrotonic acid, α-acetoxyacrylic acid, β-trans-aryloxyacrylic acid, α-chloro-β-E-methoxyacrylic acid, and β-diaminoacrylic acid.

Examples of dicarboxylic acids include maleic acid, fumaric acid, and itaconic acid.

Examples of dicarboxylic acid derivatives include methylmaleic acid, dimethylmaleic acid, phenylmaleic acid, chloromaleic acid, dichloromaleic acid, fluoromaleic acid, and maleic acid esters such as methyl allyl maleate, diphenyl maleate, nonyl maleate, decyl maleate, dodecyl maleate, octadecyl maleate, and fluoroalkyl maleate.

Examples of acid anhydrides of dicarboxylic acids include maleic anhydride, acrylic anhydride, methyl maleic anhydride, and dimethyl maleic anhydride.

Furthermore, an acid anhydride that produces a carboxyl group upon hydrolysis can also be used as a carboxylic acid group-containing monomer.

Other examples include monoesters and diesters of α,β-ethylenically unsaturated polybasic carboxylic acids such as monoethyl maleate, diethyl maleate, monobutyl maleate, dibutyl maleate, monoethyl fumarate, diethyl fumarate, monobutyl fumarate, dibutyl fumarate, monocyclohexyl fumarate, dicyclohexyl fumarate, monoethyl itaconate, diethyl itaconate, monobutyl itaconate, and dibutyl itaconate.

Examples of sulfonate group-containing monomers include vinyl sulfonic acid, methyl vinyl sulfonic acid, (meth)allyl sulfonic acid, (meth)acrylic acid-2-ethyl sulfonate, 2-acrylamido-2-methylpropane sulfonic acid, 3-allyloxy-2-hydroxypropane sulfonic acid, and styrene sulfonic acid.

In the present disclosure, "(meth)allyl" is used to indicate "allyl" and/or "methallyl".

Examples of phosphate group-containing monomers include 2-(meth)acryloyloxyethyl phosphate, methyl-2-(meth)acryloyloxyethyl phosphate, and ethyl-(meth)acryloyloxyethyl phosphate.

In the present disclosure, "(meth)acryloyl" is used to indicate "acryloyl" and/or "methacryloyl".

Examples of hydroxy group-containing monomers include ethylenically unsaturated alcohols such as (meth)allyl alcohol, 3-buten-1-ol, and 5-hexen-1-ol; alkanol esters of ethylenically unsaturated carboxylic acids such as 2-hydroxyethyl acrylate, 2-hydroxypropyl acrylate, 2-hydroxyethyl methacrylate, 2-hydroxypropyl methacrylate, di-2-hydroxyethyl maleate, di-4-hydroxybutyl maleate, and di-2-hydroxypropyl itaconate; esters of (meth)acrylic acid and polyalkylene glycol represented by a general formula $CH_2=CR^1-COO-(C_qH_{2q}O)_p-H$ (where p represents an integer of 2 to 9, q represents an integer of 2 to 4, and $R^1$ represents hydrogen or a methyl group); mono(meth)acrylic acid esters of dihydroxy esters of dicarboxylic acids such as 2-hydroxyethyl-2'-(meth)acryloyloxy phthalate and 2-hydroxyethyl-2'-(meth)acryloyloxy succinate; vinyl ethers such as 2-hydroxyethyl vinyl ether and 2-hydroxypropyl vinyl ether; mono(meth)allyl ethers of alkylene glycols such as (meth)allyl-2-hydroxyethyl ether, (meth)allyl-2-hydroxypropyl ether, (meth)allyl-3-hydroxypropyl ether, (meth)allyl-2-hydroxybutyl ether, (meth)allyl-3-hydroxybutyl ether, (meth)allyl-4-hydroxybutyl ether, and (meth)allyl-6-hydroxyhexyl ether; polyoxyalkylene glycol mono(meth)allyl ethers such as diethylene glycol mono(meth)allyl ether and dipropylene glycol mono(meth)allyl ether; mono(meth)allyl ethers of halogen or hydroxy substituted (poly)alkylene glycols such as glycerin mono(meth)allyl ether, (meth)allyl-2-chloro-3-hydroxypropyl ether, and (meth)allyl-2-hydroxy-3-chloropropyl ether; mono(meth)allyl ethers of polyhydric phenols such as eugenol and isoeugenol, and halogen substituted products thereof; and (meth)allyl thioethers of alkylene glycols such as (meth)allyl-2-hydroxyethyl thioether and (meth)allyl-2-hydroxypropyl thioether.

One hydrophilic group-containing monomer may be used individually, or a plurality of hydrophilic group-containing monomers may be used in combination. Of these hydrophilic group-containing monomers, carboxylic acid group-containing monomers are preferable, (meth)acrylic acid is more preferable, and acrylic acid is even more preferable.

The proportion in which the hydrophilic group-containing monomer unit is included in the water-soluble polymer when the amount of all monomer units is taken to be 100 mass % is preferably 2.0 mass % or more, more preferably 5.0 mass % or more, and even more preferably 10 mass % or more, and is preferably 30 mass % or less, more preferably 25 mass % or less, even more preferably 20 mass % or less, particularly preferably 15 mass % or less, and most preferably 14 mass % or less. Hydrophilicity of the water-soluble polymer increases and stability of a composition for a functional layer can be further improved when the proportion in which the hydrophilic group-containing monomer unit is included in the water-soluble polymer is at least any of the lower limits set forth above. On the other hand, residual water content in a functional layer can be reduced and cycle characteristics of a secondary battery can be further improved when the proportion in which the hydrophilic group-containing monomer unit is included in the water-soluble polymer is not more than any of the upper limits set forth above.

Examples of aromatic vinyl monomers that can form an aromatic vinyl monomer unit include styrene, a-methylstyrene, vinyltoluene, and 4-(tert-butoxy)styrene. One of these aromatic vinyl monomers may be used individually, or a plurality of these aromatic vinyl monomers may be used in combination. Of these aromatic vinyl monomers, styrene is preferable.

[Production Method of Water-Soluble Polymer]

The water-soluble polymer can be produced through polymerization of a monomer composition containing the monomers set forth above in an aqueous solvent such as water, for example. The percentage content of each monomer in the monomer composition can be set in accordance with the percentage content of each repeating unit (monomer unit) in the water-soluble polymer.

The mode of polymerization is not specifically limited and may be any of solution polymerization, suspension polymerization, bulk polymerization, emulsion polymerization, and the like. Also, any polymerization reaction can be used, such as ionic polymerization, radical polymerization, or living radical polymerization.

An additive such as an emulsifier, a dispersant, a polymerization initiator, or a polymerization aid used in polymerization may be a typically used additive. Moreover, the amounts of such additives may also be the same as typically used. The polymerization conditions may be adjusted as appropriate depending on the polymerization method, the type of polymerization initiator, and so forth.

The pH of an aqueous solution of the water-soluble polymer that is obtained after the polymerization reaction described above is preferably adjusted to at least 7 and not higher than 13 from a viewpoint of further improving stability of a composition for a functional layer. This pH adjustment can be carried out by a known method such as through addition of a subsequently described pH adjusting agent.

<Solvent>

The binder composition contains water as a solvent. The binder composition may also contain a small amount of a medium other than water, such as an organic solvent, as a solvent.

<Other Components>

The binder composition may contain any other components besides the components set forth above. These other components may be commonly known components without any specific limitations so long as they do not affect the battery reactions. One of such other components may be used individually, or a plurality of such other components may be used in combination.

Examples of other components that may be used include binders other than the water-soluble polymer set forth above (for example, a water-insoluble particulate polymer) and known additives such as dispersants, leveling agents, antioxidants, defoamers, lubricants, pH adjusting agents (for example, hydrogen chloride; ammonia; hydroxides of alkali metals such as lithium hydroxide, sodium hydroxide, and potassium hydroxide; and hydroxides of alkaline earth metals such as calcium hydroxide and magnesium hydroxide), and additives for electrolyte solution having a function of inhibiting electrolyte solution decomposition.

[Make-Up of Particulate Polymer]

Suitable examples of particulate polymers that may be used as a binder other than the water-soluble polymer set forth above include a conjugated diene monomer unit-containing polymer (conjugated diene polymer) such as a styrene-butadiene copolymer (SBR) and a (meth)acrylic acid ester monomer unit-containing polymer (acrylic polymer). Of these polymers, an acrylic polymer is more suitable. One of these particulate polymers may be used individually, or a plurality of these particulate polymers may be used in combination.

The following describes a preferred make-up of the acrylic polymer (particulate polymer) as one example. The preferred particulate polymer includes a (meth)acrylic acid ester monomer unit and an aromatic vinyl monomer unit, and may optionally include other monomer units.

—(Meth)acrylic Acid Ester Monomer Unit—

Examples of (meth)acrylic acid ester monomers that can form a (meth)acrylic acid ester monomer unit include acrylic acid alkyl esters such as methyl acrylate, ethyl acrylate, n-propyl acrylate, isopropyl acrylate, n-butyl acrylate, t-butyl acrylate, isobutyl acrylate, n-pentyl acrylate, isopentyl acrylate, hexyl acrylate, heptyl acrylate, octyl acrylate, 2-ethylhexyl acrylate, nonyl acrylate, decyl acrylate, lauryl acrylate, n-tetradecyl acrylate, and stearyl acrylate; and methacrylic acid alkyl esters such as methyl methacrylate, ethyl methacrylate, n-propyl methacrylate, isopropyl methacrylate, n-butyl methacrylate, t-butyl methacrylate, isobutyl methacrylate, n-pentyl methacrylate, isopentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, stearyl methacrylate, and glycidyl methacrylate. One of these (meth)acrylic acid ester monomers may be used individually, or a plurality of these (meth)acrylic acid ester monomers may be used in combination. Of these (meth)acrylic acid ester monomers, (meth)acrylic acid alkyl esters in which the alkyl group bonded to the non-carbonyl oxygen atom has a carbon number of 4 or more (for example, 2-ethylhexyl acrylate, butyl acrylate, and octyl acrylate) are preferable, and (meth)acrylic acid alkyl esters for which the same carbon number is 5 or more (for example, 2-ethylhexyl acrylate and octyl acrylate) are more preferable from a viewpoint of reducing residual water content in a functional layer, increasing durability of the functional layer in electrolyte solution, and further improving cycle characteristics of a secondary battery.

The proportion in which the (meth)acrylic acid ester monomer unit is included in the particulate polymer when the amount of all monomer units is taken to be 100 mass % is preferably 35 mass % or more, more preferably 40 mass % or more, and even more preferably 45 mass % or more, and is preferably 80 mass % or less, more preferably 75 mass % or less, even more preferably 70 mass % or less, particularly preferably 65 mass % or less, and most preferably 60 mass % or less. Binding ability of the particulate polymer can be increased and elution into electrolyte solution can be inhibited when the proportion in which the (meth)acrylic acid ester monomer unit is included in the particulate polymer is within any of the ranges set forth above. Consequently, durability of a functional layer in electrolyte solution can be increased and cycle characteristics of a secondary battery can be further improved.

—Aromatic Vinyl Monomer Unit—

Examples of aromatic vinyl monomers that can form an aromatic vinyl monomer unit include the same aromatic vinyl monomers as previously described in the "Water-soluble polymer" section. One of these aromatic vinyl monomers may be used individually, or a plurality of these aromatic vinyl monomers may be used in combination. The aromatic vinyl monomer is preferably styrene.

The proportion in which the aromatic vinyl monomer unit is included in the particulate polymer when the amount of all monomer units is taken to be 100 mass % is preferably 20 mass % or more, more preferably 25 mass % or more, even more preferably 30 mass % or more, and particularly preferably 35 mass % or more, and is preferably 65 mass % or less, more preferably 64.9 mass % or less, even more preferably 60 mass % or less, and particularly preferably 50 mass % or less. Elution of the particulate polymer into electrolyte solution can be inhibited and the amount of water imported into a functional layer can be reduced when the proportion in which the aromatic vinyl monomer unit is included in the particulate polymer is within any of the ranges set forth above. Consequently, durability of a functional layer in electrolyte solution can be increased and cycle characteristics of a secondary battery can be further improved.

—Other Monomer Units—

Examples of monomer units other than the (meth)acrylic acid ester monomer unit and the aromatic vinyl monomer unit that may be included in the particulate polymer include, but are not specifically limited to, an acid group-containing monomer unit and a crosslinkable monomer unit.

Examples of acid group-containing monomers that can form an acid group-containing monomer unit include the carboxylic acid group-containing monomers, sulfonate group-containing monomers, and phosphate group-containing monomers previously described in the "Water-soluble polymer" section. One of these acid group-containing monomers may be used individually, or a plurality of these acid group-containing monomers may be used in combination. Of these acid group-containing monomers, carboxylic acid group-containing monomers are preferable, and itaconic acid and maleic acid are more preferable from a viewpoint of increasing stability of a composition for a functional layer and durability of a functional layer in electrolyte solution, and improving cycle characteristics and output characteristics of a secondary battery.

The proportion in which the acid group-containing monomer unit is included in the particulate polymer when the amount of all monomer units is taken to be 100 mass % is preferably 0.1 mass % or more, more preferably 0.2 mass % or more, and even more preferably 0.3 mass % or more, and is preferably 5.0 mass % or less, more preferably 3.0 mass % or less, even more preferably 2.0 mass % or less, and particularly preferably 1.0 mass % or less. Stability of a composition for a functional layer can be further increased and durability of a functional layer in electrolyte solution can be increased when the proportion in which the acid group-containing monomer unit is included in the particulate polymer is at least any of the lower limits set forth above. Moreover, cycle characteristics of a secondary battery can be further improved while also improving output characteristics of the secondary battery. On the other hand, durability of a functional layer in electrolyte solution can be increased, residual water content in the functional layer can be reduced, and cycle characteristics of a secondary battery can be further improved when the proportion of the acid group-containing monomer unit is not more than any of the upper limits set forth above.

Examples of crosslinkable monomers that can form a crosslinkable monomer unit include the same crosslinkable monomers as previously described in the "Water-soluble polymer" section. One of these crosslinkable monomers may be used individually, or a plurality of these crosslinkable monomers may be used in combination. Of these crosslinkable monomers, ethylene dimethacrylate and divinylbenzene are preferable from a viewpoint of reducing residual water content in a functional layer and further improving cycle characteristics of a secondary battery. Moreover, ethylene dimethacrylate is particularly preferable from a viewpoint of further improving stability of a composition for a functional layer.

The proportion in which the crosslinkable monomer unit is included in the particulate polymer when the amount of all monomer units is taken to be 100 mass % is preferably 0.01 mass % or more, more preferably 0.1 mass % or more, and even more preferably 0.5 mass % or more, and is preferably 5.0 mass % or less, more preferably 4.0 mass % or less, and even more preferably 3.0 mass % or less. Durability of a functional layer in electrolyte solution can be increased and cycle characteristics of a secondary battery can be further improved when the proportion in which the crosslinkable monomer unit is included in the particulate polymer is at least any of the lower limits set forth above. Moreover, deformation of the particulate polymer due to shear can be inhibited and stability of a composition for a functional layer can be further increased. On the other hand, the particulate polymer can display excellent binding ability and durability of a functional layer in electrolyte solution can be further increased when the proportion in which the crosslinkable monomer unit is included in the particulate polymer is not more than any of the upper limits set forth above. Consequently, cycle characteristics of a secondary battery can be further improved.

[Production Method of Particulate Polymer]

The particulate polymer can be produced through polymerization of a monomer composition containing the monomers set forth above in an aqueous solvent such as water, for example. The percentage content of each monomer in the monomer composition can be set in accordance with the percentage content of each repeating unit (monomer unit) in the particulate polymer.

The mode of polymerization is not specifically limited and may be any of solution polymerization, suspension polymerization, bulk polymerization, emulsion polymerization, and the like. Also, any polymerization reaction can be used, such as ionic polymerization, radical polymerization, or living radical polymerization.

An additive such as an emulsifier, a dispersant, a polymerization initiator, or a polymerization aid used in polymerization may be a typically used additive. Moreover, the amounts of such additives may be the same as typically used. The polymerization conditions may be adjusted as appropriate depending on the polymerization method, the type of polymerization initiator, and so forth.

[Compounding Ratio of Water-Soluble Polymer and Particulate Polymer]

No specific limitations are placed on the compounding ratio of the water-soluble polymer and the particulate polymer in the binder composition and in the subsequently described composition for a functional layer. For example, the amount of the particulate polymer per 100 parts by mass of the water-soluble polymer is preferably at least 10 parts by mass and not more than 500 parts by mass.

<Production of Binder Composition for Non-Aqueous Secondary Battery Functional Layer>

The presently disclosed binder composition may be produced by any method without any specific limitations and can, for example, be produced by mixing the components set forth above by a known method. In a situation in which the water-soluble polymer is produced through polymerization of a monomer composition in an aqueous solvent, the resultant aqueous solution of the water-soluble polymer may be used as a binder composition as produced or other components may be mixed with the aqueous solution of the water-soluble polymer to produce a binder composition.

(Composition for Non-Aqueous Secondary Battery Functional Layer)

The presently disclosed composition for a non-aqueous secondary battery functional layer is an aqueous slurry composition that contains the binder composition for a non-aqueous secondary battery functional layer set forth above and non-conductive particles, and may optionally further contain other components. In other words, the presently disclosed composition for a functional layer contains non-conductive particles, the water-soluble polymer set forth above, and water serving as a dispersion medium, and may optionally further contain other components.

The presently disclosed composition for a functional layer has excellent stability as a result of containing the presently disclosed binder composition. Moreover, a secondary battery can be caused to display excellent cycle characteristics through a functional layer that is produced using the presently disclosed composition for a functional layer.

<Non-Conductive Particles>

The non-conductive particles are particles that that maintain their shape without dissolving in water or a non-aqueous electrolyte solution of a secondary battery. Moreover, the non-conductive particles are electrochemically stable and are, therefore, present stably in a functional layer in the environment of use of a secondary battery.

Various types of inorganic fine particles and organic fine particles can be used as the non-conductive particles.

Specifically, although both inorganic fine particles and organic fine particles (excluding a particulate polymer used as a binder) can be used as the non-conductive particles, inorganic fine particles are normally used. The material of the non-conductive particles is preferably an electrochemically stable material that is present stably in the environment of use of a non-aqueous secondary battery. Examples of non-conductive particles that are preferable from such a viewpoint include particles of oxides such as aluminum oxide (alumina), hydrated aluminum oxide (Boehmite (AlOOH)) gibbsite ($Al(OH)_3$), silicon oxide, magnesium oxide (magnesia), calcium oxide, titanium oxide (titania), barium titanate ($BaTiO_3$), ZrO, and alumina-silica composite oxide; particles of nitrides such as aluminum nitride and boron nitride; particles of covalent crystals such as silicon and diamond; particles of sparingly soluble ionic crystals such as barium sulfate, calcium fluoride and barium fluoride; and fine particles of clays such as talc and montmorillonite. These particles may be subjected to element substitution, surface treatment, solid solution treatment, or the like as necessary.

One of these types of non-conductive particles may be used individually, or a plurality of these types of non-conductive particles may be used in combination.

<Compounding Ratio of Binder Composition and Non-Conductive Particles>

No specific limitations are placed on the compounding ratio of the non-conductive particles and the binder composition for a non-aqueous secondary battery functional layer in the composition for a non-aqueous secondary battery functional layer. For example, the composition for a functional layer may contain the binder composition in an amount such that the amount of the water-soluble polymer per 100 parts by mass of the non-conductive particles is preferably 1 part by mass or more, more preferably 1.5 parts by mass or more, and even more preferably 2 parts by mass or more, and is preferably 10 parts by mass or less, more preferably 8 parts by mass or less, and even more preferably 5 parts by mass or less. Durability of a functional layer in electrolyte solution can be increased and cycle characteristics of a secondary battery can be further improved when the amount of the water-soluble polymer in the composition for a functional layer is at least any of the lower limits set forth above. On the other hand, stability of the composition for a functional layer can be ensured and an increase in internal resistance can be suppressed so as to cause a secondary battery to display excellent output characteristics when the amount of the water-soluble polymer in the composition for a functional layer is not more than any of the upper limits set forth above.

<Dispersion Medium>

The composition for a functional layer contains water as a dispersion medium. The composition for a functional layer may also contain a small amount of a medium other than water, such as an organic solvent, as a dispersion medium. Water contained in the binder composition as a solvent may be used as the water serving as a dispersion medium of the composition for a functional layer.

<Other Components>

The composition for a functional layer may contain any other components besides the components set forth above. These other components may be commonly known components without any specific limitations so long as they do not affect the battery reactions. One of such other components may be used individually, or a plurality of such other components may be used in combination.

Examples of other components in the composition for a functional layer include the same other components (binders and additives) that may be contained in the binder composition set forth above.

<Production of Composition for Non-Aqueous Secondary Battery Functional Layer>

The presently disclosed composition for a non-aqueous secondary battery functional layer can be obtained by mixing the binder composition set forth above, the non-conductive particles, and optional components (for example, water added as a dispersion medium and other components such as mentioned above) as necessary without any specific limitations.

Although no specific limitations are placed on the mixing method and the mixing order of the components set forth above, mixing is preferably performed using a disperser as a mixer so as to efficiently disperse the components. The disperser is preferably a device that can homogeneously disperse and mix the components. Examples of dispersers that may be used include a ball mill, a sand mill, a pigment disperser, a grinding machine, an ultrasonic disperser, a homogenizer, and a planetary mixer.

(Functional Layer for Non-Aqueous Secondary Battery)

The presently disclosed functional layer for a non-aqueous secondary battery is a functional layer that is formed from the composition for a non-aqueous secondary battery functional layer set forth above. For example, the presently disclosed functional layer for a non-aqueous secondary battery can be formed by applying the composition for a functional layer set forth above onto the surface of an appropriate substrate to form an applied film and subsequently drying the applied film. In other words, the presently disclosed functional layer for a non-aqueous secondary battery is composed by a dried product of the composition for a non-aqueous secondary battery functional layer set forth above. Moreover, the presently disclosed functional layer for a non-aqueous secondary battery contains the non-conductive particles and the water-soluble polymer, and may optionally contain binders other than the water-soluble polymer and additives. In a case in which the water-soluble polymer set forth above includes a crosslinkable monomer unit, the polymer including the crosslinkable monomer unit may be crosslinked, for example, in drying of the composition for a non-aqueous secondary battery functional layer or in heat treatment that is optionally carried out after the drying (i.e., the functional layer for a non-aqueous secondary battery may contain a crosslinked product of the water-soluble polymer set forth above).

The presently disclosed functional layer for a non-aqueous secondary battery has low residual water content and excellent durability in electrolyte solution as a result of being formed using the composition for a non-aqueous secondary battery functional layer set forth above. Consequently, a secondary battery can be caused to display excellent cycle characteristics through use of the presently disclosed functional layer for a non-aqueous secondary battery.

<Substrate>

No specific limitations are placed on the substrate onto which the composition for a functional layer is applied. In one example, an applied film of the composition for a functional layer is formed on the surface of a releasable substrate, the applied film is dried to form a functional layer, and the releasable substrate is peeled from the functional layer. A functional layer that is peeled from a releasable substrate in this manner can be used as a free-standing film in formation of a battery member of a secondary battery. Specifically, the functional layer that has been peeled from the releasable substrate may be stacked on a separator substrate to form a separator including the functional layer or may be stacked on an electrode substrate to form an electrode including the functional layer.

However, it is preferable that a separator substrate or an electrode substrate is used as the substrate from a viewpoint of raising battery member production efficiency since a step of peeling the functional layer can be omitted. The functional layer that is formed on the separator substrate or electrode substrate can suitably be used as a protective layer that improves heat resistance, strength, and so forth of the separator or electrode.

[Separator Substrate]

The separator substrate is not specifically limited and may be a known separator substrate such as an organic separator substrate. The organic separator substrate is a porous member that is made from an organic material. Examples of organic separator substrates that may be used include microporous membranes and non-woven fabric containing a polyolefin resin such as polyethylene or polypropylene, an aromatic polyamide resin, or the like. A microporous membrane or non-woven fabric made from polyethylene is preferable due to having excellent strength. Although the separator substrate may be of any thickness, the thickness is preferably at least 5 µm and not more than 30 µm. A separator substrate thickness of 5 µm or more provides adequate safety, whereas a separator substrate thickness of 30 µm or less can inhibit reduction of ion conductivity to inhibit deterioration of secondary battery output characteristics and can inhibit an increase in thermal contraction force of the separator substrate to increase heat resistance.

[Electrode Substrate]

The electrode substrate (positive/negative electrode substrate) is not specifically limited and may be an electrode substrate obtained by forming an electrode mixed material layer on a current collector.

Herein, the current collector, an electrode active material (positive/negative electrode active material) and a binder for an electrode mixed material layer (binder for positive/negative electrode mixed material layer) in the electrode mixed material layer, and the method by which the electrode mixed material layer is formed on the current collector may be known examples thereof such as described, for example, in JP 2013-145763 A.

<Formation Method of Functional Layer for Non-Aqueous Secondary Battery>

(1) A method in which the presently disclosed composition for a functional layer is applied onto the surface of a separator substrate or an electrode substrate (surface at the electrode mixed material layer-side in the case of an electrode substrate; same applies below) and is subsequently dried (2) A method in which a separator substrate or an electrode substrate is immersed in the presently disclosed composition for a functional layer and the substrate that has been immersed is subsequently dried (3) A method in which the presently disclosed composition for a functional layer is applied onto a releasable substrate and is dried to form a functional layer, and then the obtained functional layer is transferred onto the surface of a separator substrate or an electrode substrate Of the methods set forth above, method (1) is particularly preferable since it facilitates layer thickness control of the functional layer. Method (1) more specifically includes a step of applying the composition for a functional layer onto a substrate (application step) and a step of drying the composition for a functional layer that has been applied onto the substrate to form a functional layer (functional layer formation step).

[Application Step]

Examples of methods by which the composition for a functional layer may be applied onto the substrate in the application step include, but are not specifically limited to, doctor blading, reverse roll coating, direct roll coating, gravure coating, extrusion coating, and brush coating.

[Functional Layer Formation Step]

The method by which the composition for a functional layer on the substrate is dried in the functional layer formation step may be a commonly known method without any specific limitations. Examples of drying methods that may be used include drying by warm, hot, or low-humidity air, drying in a vacuum, and drying by irradiation with infrared light, an electron beam, or the like. Although no specific limitations are placed on the drying conditions, the drying temperature is preferably 40° C. to 150° C. and the drying time is preferably 2 minutes to 30 minutes. Water can be efficiently removed from the presently disclosed composition for a functional layer in the functional layer formation step as a result of the composition for a functional layer containing the water-soluble polymer having a contact angle with water that is within a specific range.

<Thickness of Functional Layer>

The thickness of the functional layer formed using the presently disclosed composition for a non-aqueous secondary battery functional layer is preferably at least 0.5 µm and not more than 5 µm. A functional layer thickness of 0.5 µm or more can further increase protective function of the functional layer and thereby further improve heat resistance and strength of a battery member that is provided with the functional layer, whereas a functional layer thickness of 5 µm or less can cause a secondary battery to display excellent output characteristics.

(Battery Member for Non-Aqueous Secondary Battery Including Functional Layer)

A battery member (separator or electrode) including the presently disclosed functional layer may include, in addition to the separator substrate or electrode substrate and the presently disclosed functional layer, elements of configuration other than the presently disclosed functional layer set forth above so long as the effects of the present disclosure are not significantly lost.

No specific limitations are placed on such elements of configuration other than the presently disclosed functional layer so long as they are elements that do not correspond to the presently disclosed functional layer, and one example thereof is an adhesive layer that is provided on the presently disclosed functional layer and is used to adhere battery members to one another.

(Non-Aqueous Secondary Battery)

The presently disclosed non-aqueous secondary battery includes the presently disclosed functional layer for a non-aqueous secondary battery set forth above. More specifically, the presently disclosed non-aqueous secondary battery includes a positive electrode, a negative electrode, a separator, and an electrolyte solution, wherein at least one battery member among the positive electrode, the negative electrode, and the separator includes the functional layer for a non-aqueous secondary battery set forth above. The presently disclosed non-aqueous secondary battery can display excellent battery characteristics (for example, cycle characteristics).

<Positive Electrode, Negative Electrode, and Separator>

At least one of the positive electrode, the negative electrode, and the separator used in the presently disclosed secondary battery includes the presently disclosed functional layer. Specifically, an electrode produced by forming an electrode mixed material layer on a current collector to form an electrode substrate and then providing the presently disclosed functional layer on the electrode substrate may be used as a positive electrode or negative electrode that includes a functional layer. Moreover, a separator produced by providing the presently disclosed functional layer on a separator substrate may be used as a separator that includes a functional layer. The electrode substrate and the separator substrate can be any of the examples previously described in the "Functional layer for non-aqueous secondary battery" section.

Furthermore, an electrode composed by an electrode substrate such as set forth above or a separator composed by a separator substrate such as set forth above may be used as a positive electrode, negative electrode, or separator that does not include a functional layer without any specific limitations.

<Electrolyte Solution>

The electrolyte solution is normally an organic electrolyte solution obtained by dissolving a supporting electrolyte in an organic solvent. The supporting electrolyte may, for example, be a lithium salt in the case of a lithium ion secondary battery. Examples of lithium salts that may be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable as they readily dissolve in solvents and exhibit a high degree of dissociation. Note that one electrolyte may be used individually, or a plurality of electrolytes may be used in combination. In general, lithium ion conductivity tends to increase when a supporting electrolyte having a high degree of dissociation is used. Therefore, lithium ion conductivity can be adjusted through the type of supporting electrolyte that is used.

No specific limitations are placed on the organic solvent used in the electrolyte solution so long as the supporting electrolyte can dissolve therein. Suitable examples of organic solvents that may be used in the case of a lithium ion secondary battery include alkyl carbonates such as dimethyl carbonate (DMC), ethylene carbonate (EC), diethyl carbonate (DEC), propylene carbonate (PC), butylene carbonate (BC), and methyl ethyl carbonate (MEC); esters such as γ-butyrolactone and methyl formate; ethers such as 1,2-dimethoxyethane and tetrahydrofuran; and sulfur-containing compounds such as sulfolane and dimethyl sulfoxide. The electrolyte solution may be used with additives contained therein. Compounds based on carbonates such as vinylene carbonate (VC) are preferable as additives.

(Production Method of Non-Aqueous Secondary Battery)

The presently disclosed non-aqueous secondary battery set forth above can be produced by, for example, stacking the positive electrode and the negative electrode with the separator interposed between, performing rolling, folding, or the like of the resultant stack as necessary to place the stack in a battery container, injecting the electrolyte solution into the battery container, and sealing the battery container. At least one member among the positive electrode, the negative electrode, and the separator is a functional layer-equipped member. In order to prevent pressure increase inside the battery and occurrence of overcharging or overdischarging, an expanded metal; an overcurrent preventing device such as a fuse or a PTC device; or a lead plate may be provided in the battery container as necessary. The shape of the battery may be a coin type, button type, sheet type, cylinder type, prismatic type, flat type, or the like.

EXAMPLES

The following provides a more specific description of the present disclosure based on examples. However, the present disclosure is not limited to the following examples. In the following description, "%", "ppm", and "parts" used to express quantities are by mass unless otherwise specified.

Moreover, in the case of a polymer that is produced through copolymerization of a plurality of monomers, the proportion constituted by a monomer unit in the polymer that is formed through polymerization of a given monomer is normally, unless otherwise specified, the same as the ratio (charging ratio) of the given monomer among all monomers used in polymerization of the polymer.

In the examples and comparative examples, the following methods were used to measure and evaluate the contact angle with water, degree of swelling in electrolyte solution, and weight average molecular weight of a water-soluble polymer, the stability of a composition for a functional layer, the peel strength, water content, and durability in electrolyte solution of a functional layer, and the output characteristics and cycle characteristics of a secondary battery.

<Contact Angle of Water-Soluble Polymer with Water>

Further deionized water was added to an obtained aqueous solution of a water-soluble polymer (binder composition) to adjust the solid content concentration to 2%. The aqueous solution of the water-soluble polymer for which adjustment of the solid content concentration had been performed was applied onto copper foil and was dried for 10 minutes at 50° C. in an oven to produce a binder film of 100 μm in thickness. Next, 1 μL of distilled water was dripped onto the obtained binder film, a photograph of a water droplet on the binder film was taken after 1 minute had elapsed from landing of the droplet under conditions of a temperature of 25° C. and a humidity of 50%, and the contact angle of the water droplet was measured by the half angle method (θ/2 method). Operations from dripping of distilled water to measurement of the contact angle were performed a total of five times at different locations on the binder film and an average value of the five measured values was taken to be the contact angle of the water-soluble polymer.

<Degree of Swelling of Water-Soluble Polymer in Electrolyte Solution>

An obtained aqueous solution of a water-soluble polymer (binder composition) was applied onto copper foil and was dried by a hot-air dryer for 20 minutes at 50° C. and for 20 minutes at 120° C. to produce a 1 cm×1 cm binder film (thickness: 100 μm). The weight M0 of the produced binder film was measured. Thereafter, the obtained binder film was immersed in electrolyte solution for 72 hours at 60° C. The electrolyte solution was a solution obtained by dissolving $LiPF_6$ with a concentration of 1 mol/L as a supporting electrolyte in a mixed solvent of EC, DEC, and VC (EC/DEC/VC=68.5/30/1.5 (volume mixing ratio at 25° C.)). After immersion, electrolyte solution was wiped from the surface of the binder film and the weight M1 of the binder film was measured. The degree of swelling of the water-soluble polymer in electrolyte solution was calculated by the following equation.

Degree of swelling in electrolyte solution=$M1/M0$

<Weight Average Molecular Weight of Water-Soluble Polymer>

An obtained aqueous solution of a water-soluble polymer (binder composition) was diluted to 0.3 mass % with the eluent shown below to obtain a measurement sample. The obtained measurement sample was analyzed by gel permeation chromatography (GPC) under the following conditions to determine the weight average molecular weight of the water-soluble polymer.

GPC apparatus: Produced by Tosoh Corporation
Column: Guard column PWXL×1, GMPWXL×1, G2500PWXL×1 (temperature 45° C.) produced by Tosoh Corporation
Eluent: 0.1 mol/L Sodium nitrate ($NaNO_3$) aqueous solution
Flow rate: 0.5 mL/min
Detector: Differential refractive index detector RI-201 produced by Showa Denko K.K.; sensitivity: 16
Standard material: Monodisperse poly(ethylene oxide)

<Stability of Composition for Functional Layer>

A gravure roll (number of lines: 95) was used to apply a composition for a functional layer onto a separator substrate (made from polyethylene) under conditions of a conveyance speed of 10 m/min and a gravure rotation ratio of 100%. After application, the separator substrate was cut out and the applied amount per unit area M0 (mg/cm$^2$) was calculated. The applied amount M1 (mg/cm$^2$) was calculated in the same manner after 1 hour of application. The rate of change of applied amount ΔM (%) was calculated using an equation: ΔM=(|M0−M1|)/M0×100(%), and was evaluated as shown below. A smaller value indicates a smaller change in applied amount under shear and higher stability of the composition for a functional layer.

A: Rate of change of applied amount ΔM of less than 5%
B: Rate of change of applied amount ΔM of at least 5% and less than 10%
C: Rate of change of applied amount ΔM of at least 10% and less than 20%
D: Rate of change of applied amount ΔM of 20% or more <Peel Strength of Functional Layer>

An obtained functional layer-equipped separator was cut out to 100 mm×10 mm to obtain a specimen. Cellophane tape was fixed to a test bed in advance. Tape prescribed by JIS Z1522 was used as the cellophane tape.

The specimen that had been cut out from the separator was affixed to the cellophane tape with the functional layer positioned underneath. Subsequently, one end of the separator was pulled vertically at a pulling speed of 100 mm/min and the stress when the separator was peeled off was measured. This measurement was carried out three times. The average value of the measured stress values was determined and was taken to be the peel strength of the functional layer. The peel strength was evaluated by the following standard.

A: Peel strength of 50 N/m or more
B: Peel strength of at least 35 N/m and less than 50 N/m
C: Peel strength of at least 20 N/m and less than 35 N/m
D: Peel strength of less than 20 N/m <Water Content of Functional Layer>

An obtained functional layer-equipped separator was cut out to 10 cm×10 cm to obtain a specimen. The specimen was left for 24 hours at a temperature of 25° C. and a humidity of 50%. Thereafter, the water content of the specimen was measured by the Karl Fischer method (JIS K0068 (2001); water vaporization method; vaporization temperature: 150° C.) using a coulometric titration water meter. The water content was evaluated by the following standard.

A: Water content of 500 ppm or less
B: Water content of more than 500 ppm and not more than 600 ppm
C: Water content of more than 600 ppm and not more than 700 ppm
D: Water content of more than 700 ppm <Durability of Functional Layer in Electrolyte Solution>

An obtained functional layer-equipped separator was cut out to 5 cm×5 cm to obtain a specimen. The weight M0 of the functional layer was calculated by weighing the specimen and subtracting the weight of the separator substrate. Next, the specimen was immersed in a mixed solvent for an electrolyte solution (mixed solvent of EC, DEC, and VC (EC/DEC/VC=68.5/30/1.5 (volume mixing ratio at 25° C.))) having a temperature of 60° C. and was subjected to ultrasonic vibration for 10 minutes at 30 kHz. Thereafter, the specimen was removed from the mixed solvent and was dried for 10 minutes in a 60° C. atmosphere. The weight M1 of the functional layer after drying was calculated in the same manner as the weight M0. The rate of vibration detachment ΔM (%) was calculated using an equation: ΔM={(M0−M1)/M0}×100, and was evaluated as shown below. A smaller value indicates better durability of the functional layer in electrolyte solution.

A: Rate of vibration detachment ΔM of less than 20%
B: Rate of vibration detachment ΔM of at least 20% and less than 40%
C: Rate of vibration detachment ΔM of at least 40% and less than 60%
D: Rate of vibration detachment ΔM of 60% or more <Output Characteristics of Secondary Battery>

A produced lithium ion secondary battery was left at rest for 24 hours in a 25° C. environment and was subsequently subjected to a charge operation with a 0.1 C charge rate for 5 hours in a 25° C. environment. The voltage V0 in this operation was measured. Thereafter, the lithium ion secondary battery was subjected to a discharge operation with a 1 C discharge rate in a −10° C. environment and the voltage V1 once 15 seconds had elapsed from the start of discharging was measured. The voltage change ΔV(=V0−V1) was determined and was evaluated by the following standard. A smaller voltage change ΔV indicates better output characteristics (low-temperature characteristics) of the secondary battery.

A: Voltage change ΔV of 500 mV or less
B: Voltage change ΔV of more than 500 mV and not more than 700 mV
C: Voltage change ΔV of more than 700 mV and not more than 900 mV
D: Voltage change ΔV of more than 900 mV <Cycle Characteristics of Secondary Battery>

Ten produced lithium ion secondary batteries were each subjected to 200 cycles of an operation in which one cycle involved charging to 4.2 V by a 0.2 C constant-current method and discharging to 3.0 V in a 25° C. environment. A charge/discharge capacity retention rate (%) expressed by the ratio of the average value of electrical capacity at the end of 200 cycles and the average value of electrical capacity at the end of 5 cycles ((Average value of electrical capacity at end of 200 cycles/Average value of electrical capacity at end of 5 cycles)×100) was calculated and was evaluated by the following standard. A higher charge/discharge capacity retention rate indicates better cycle characteristics.

A: Charge/discharge capacity retention rate of 80% or more
B: Charge/discharge capacity retention rate of at least 70% and less than 80%

C: Charge/discharge capacity retention rate of at least 60% and less than 70%

D: Charge/discharge capacity retention rate of less than 60%

Example 1

<Production of Water-Soluble Polymer>

A 1 L flask equipped with a septum was charged with 712 g of deionized water. The deionized water was heated to a temperature of 40° C., and the inside of the flask was purged with nitrogen gas at a flow rate of 100 mL/min. Next, 32.3 g (85.0%) of acrylamide as a (meth)acrylamide monomer, 4.6 g (12.2%) of acrylic acid as a hydrophilic group-containing monomer, 0.12 g (0.3%) of allyl methacrylate as a crosslinkable monomer, and 0.95 g (2.5%) of 2,2,2-trifluoroethyl methacrylate as a fluorine-containing (meth) acrylic acid ester monomer were mixed and then injected into the flask by a syringe. Thereafter, 8.0 g of 2.5% potassium persulfate aqueous solution was added (first addition of potassium persulfate) into the flask by a syringe as a polymerization initiator. Once 15 minutes had passed from addition of the polymerization initiator, 40 g of 2.0% tetramethylethylenediamine aqueous solution was added (first addition of tetramethylethylenediamine) by a syringe as a polymerization accelerator. After 4 hours had passed, 4.0 g of 2.5% potassium persulfate aqueous solution was added (second addition of potassium persulfate) into the flask as a polymerization initiator and 20 g of 2.0% tetramethylethylenediamine aqueous solution was further added (second addition of tetramethylethylenediamine) as a polymerization accelerator, the temperature was increased to 60° C., and a polymerization reaction was carried out. After 3 hours had passed, the flask was opened to air to terminate the polymerization reaction, and the product was deodorized at a temperature of 80° C. to remove residual monomers.

The product was subsequently adjusted to pH 8 with 10% sodium hydroxide aqueous solution to obtain an aqueous solution of a water-soluble polymer (binder composition). The contact angle with water, degree of swelling in electrolyte solution, and weight average molecular weight of the water-soluble polymer were measured. The results are shown in Table 1.

<Production of Particulate Polymer>

A reactor equipped with a stirrer was charged with 70 parts of deionized water, 0.15 parts of sodium lauryl sulfate (EMAL® 2F (EMAL is a registered trademark in Japan, other countries, or both) produced by Kao Corporation) as an emulsifier, and 0.5 parts of ammonium persulfate. The gas phase in the reactor was purged with nitrogen gas and the reactor was heated to 60° C.

Meanwhile, a monomer composition was prepared in a separate vessel by mixing 50 parts of deionized water, 0.5 parts of sodium dodecylbenzenesulfonate as a dispersant, 58.2 parts of 2-ethylhexyl acrylate as a (meth)acrylic acid ester monomer, 40 parts of styrene as an aromatic vinyl monomer, 0.8 parts of itaconic acid as an acid group-containing monomer, and 1.0 parts of ethylene dimethacrylate as a crosslinkable monomer. The monomer composition was continuously added to the reactor over 4 hours to carry out polymerization. The reaction was carried out at 60° C. during the addition. Once the addition was completed, stirring was performed for a further 3 hours at 70° C. to complete the reaction and yield a water dispersion of a particulate polymer.

<Production of Composition for Functional Layer>

A composition for a functional layer was produced by mixing 100 parts in terms of solid content of a water dispersion of alumina particles (LS256 produced by Nippon Light Metal Co., Ltd.) as non-conductive particles, 2.5 parts in terms of solid content of the aqueous solution of the water-soluble polymer described above, 2.5 parts in terms of solid content of the water dispersion of the particulate polymer described above, 0.2 parts of a polyethylene glycol surfactant (SAN NOPCO® SN WET 366 (SAN NOPCO is a registered trademark in Japan, other countries, or both) produced by SAN NOPCO Ltd.), and water. The amount of water was adjusted such that the solid content concentration of the composition was 40%. The stability of the obtained composition for a functional layer was evaluated. The results are shown in Table 1.

<Production of Functional Layer and Functional Layer-Equipped Separator>

An organic separator substrate (2500 produced by Celgard, LLC.; thickness: 25 μm) made from polyethylene was prepared as a separator substrate. The composition for a functional layer obtained as described above was applied onto one side of the prepared organic separator substrate and was dried for 3 minutes at 50° C. In this manner, a separator including a functional layer (thickness: 2 μm) at one side thereof (i.e., a functional layer-equipped separator) was obtained. The obtained functional layer-equipped separator was used to evaluate the peel strength, water content, and durability in electrolyte solution of the functional layer. The results are shown in Table 1.

<Production of Negative Electrode>

A 5 MPa pressure vessel equipped with a stirrer was charged with 33 parts of 1,3-butadiene, 3.5 parts of itaconic acid, 63.5 parts of styrene, 0.4 parts of sodium dodecylbenzenesulfonate as an emulsifier, 150 parts of deionized water, and 0.5 parts of potassium persulfate as a polymerization initiator. These materials were sufficiently stirred and were subsequently heated to 50° C. to initiate polymerization. The reaction was terminated by cooling at the point at which the polymerization conversion rate reached 96% to yield a mixture containing a binder (SBR) for a negative electrode mixed material layer. The mixture containing the binder for a negative electrode mixed material layer was adjusted to pH 8 through addition of 5% sodium hydroxide aqueous solution. Next, the mixture was subjected to thermal-vacuum distillation to remove unreacted monomers and was subsequently cooled to 30° C. or lower to yield a water dispersion containing the desired binder for a negative electrode mixed material layer.

After 100 parts of artificial graphite (average particle diameter: 15.6 μm) as a negative electrode active material, 1 part in terms of solid content of a 2% aqueous solution of a sodium salt of carboxymethyl cellulose (MAC350HC produced by Nippon Paper Industries Co., Ltd.) as a water-soluble polymer, and deionized water had been mixed and adjusted to a solid content concentration of 68%, these materials were mixed for 60 minutes at 25° C. The solid content concentration was subsequently adjusted to 62% with deionized water and a further 15 minutes of mixing was performed at 25° C. Next, 1.5 parts in terms of solid content of the binder for a negative electrode mixed material layer described above and deionized water were added to the resultant mixture, the final solid content concentration was adjusted to 52%, and a further 10 minutes of mixing was performed. The resultant mixture was subjected to defoaming under reduced pressure to yield a slurry composition for a secondary battery negative electrode having good fluidity.

A comma coater was used to apply the obtained slurry composition for a negative electrode onto copper foil (current collector) of 20 μm in thickness such that the film thickness after drying was approximately 150 μm. The applied slurry composition was dried by conveying the copper foil inside a 60° C. oven for 2 minutes at a speed of 0.5 m/min. Thereafter, heat treatment was performed for 2 minutes at 120° C. to obtain a pre-pressing negative electrode web. The pre-pressing negative electrode web was rolled by roll pressing to obtain a post-pressing negative electrode (one-sided negative electrode) including a negative electrode mixed material layer of 80 μm in thickness.

In addition, application was performed in the same way on a rear surface of the pre-pressing negative electrode web to form negative electrode mixed material layers at both sides and rolling was performed by roll pressing to obtain a post-pressing negative electrode (two-sided negative electrode) including negative electrode mixed material layers of 80 μm each in thickness.

<Production of Positive Electrode>

A slurry composition for a positive electrode was obtained by combining 100 parts of $LiCoO_2$ (volume average particle diameter: 12 μm) as a positive electrode active material, 2 parts of acetylene black (HS-100 produced by Denki Kagaku Kogyo Kabushiki Kaisha) as a conductive material, 2 parts in terms of solid content of polyvinylidene fluoride (#7208 produced by Kureha Corporation) as a binder for a positive electrode mixed material layer, and N-methylpyrrolidone in an amount such that the total solid content concentration was 70% and performing mixing of these materials.

A comma coater was used to apply the obtained slurry composition for a positive electrode onto aluminum foil (current collector) of 20 μm in thickness such that the film thickness after drying was approximately 150 μm. The applied slurry composition was dried by conveying the aluminum foil inside a 60° C. oven for 2 minutes at a speed of 0.5 m/min. Thereafter, heat treatment was performed for 2 minutes at 120° C. to obtain a pre-pressing positive electrode web. The pre-pressing positive electrode web was rolled by roll pressing to obtain a post-pressing positive electrode (one-sided positive electrode) including a positive electrode mixed material layer of 80 μm in thickness.

In addition, application was performed in the same way on a rear surface of the pre-pressing positive electrode web described above to form positive electrode mixed material layers at both sides and rolling was performed by roll pressing to obtain a post-pressing positive electrode (two-sided positive electrode) including positive electrode mixed material layers of 80 μm each in thickness.

<Production of Secondary Battery>

A single-sided positive electrode obtained as described above was cut out to 5 cm×15 cm and a functional layer-equipped separator cut out to 6 cm×16 cm was positioned thereon (at the positive electrode mixed material layer-side) such that the functional layer was in opposition to the one-sided positive electrode. Next, a two-sided negative electrode cut out to 5.5 cm×15.5 cm was positioned at the organic separator substrate-side of the functional layer-equipped separator to obtain a laminate A. A functional layer-equipped separator cut out to 6 cm×16 cm was positioned at the two-sided negative electrode-side of the laminate A such that the organic separator substrate was in opposition to the two-sided negative electrode. Moreover, a two-sided positive electrode cut out to 5 cm×15 cm was stacked at the functional layer side of the functional layer-equipped separator. Next, a functional layer-equipped separator cut out to 6 cm×16 cm was positioned on the two-sided positive electrode such that the functional layer was in opposition to the two-sided positive electrode. Finally, a one-sided negative electrode cut out to 5.5 cm×5.5 cm was stacked on the functional layer-equipped separator such that the negative electrode mixed material layer was in opposition to the organic separator substrate of the functional layer-equipped separator to obtain a laminate B. The laminate B was packed into an aluminum packing case serving as a battery case, and an electrolyte solution (solution obtained by dissolving $LiPF_6$ of 1 mol/L in concentration as a supporting electrolyte in a mixed solvent of EC, DEC, and VC (EC/DEC/VC (volume ratio at 25° C.)=68.5/30/1.5)) was injected such that no air remained. The aluminum packing case was closed by heat sealing at 150° C. and the resultant battery case was subjected to flat pressing for 2 minutes at 100° C. and 100 kgf to produce a 1,000 mAh laminate-type lithium ion secondary battery.

The output characteristics and cycle characteristics of the obtained secondary battery were evaluated. The results are shown in Table 1.

Examples 2 to 8

A water-soluble polymer, a particulate polymer, a composition for a functional layer, a functional layer-equipped separator, a positive electrode, a negative electrode, and a secondary battery were produced in the same way as in Example 1 with the exception that the make-up of the water-soluble polymer was changed as shown in Table 1. Each evaluation was performed in the same way as in Example 1. The results are shown in Table 1.

Examples 9 and 10

A water-soluble polymer, a particulate polymer, a composition for a functional layer, a functional layer-equipped separator, a positive electrode, a negative electrode, and a secondary battery were produced in the same way as in Example 1 with the exception that that in production of the water-soluble polymer, the additive amount of 2.0% tetramethylethylenediamine aqueous solution in the first addition of tetramethylethylenediamine was changed to 50 g and 10 g in Examples 9 and 10, respectively. Each evaluation was performed in the same way as in Example 1. The results are shown in Table 1.

Examples 11 to 14

A water-soluble polymer, a particulate polymer, a composition for a functional layer, a functional layer-equipped separator, a positive electrode, a negative electrode, and a secondary battery were produced in the same way as in Example 1 with the exception that in production of the water-soluble polymer, the additive amount of 2.0% tetramethylethylenediamine aqueous solution in the first addition of tetramethylethylenediamine was set as 35 g, 25 g, 20 g, and 35 g in Examples 11 to 14, respectively, the additive amount of 2.0% tetramethylethylenediamine aqueous solution in the second addition of tetramethylethylenediamine was set as 15 g in each of Examples 11 to 14, the additive amount of 2.5% potassium persulfate aqueous solution in the first addition of potassium persulfate was set as 6 g, 5 g, 4 g, and 6 g in Examples 11 to 14, respectively, and the additive amount of 2.5% potassium persulfate aqueous solution in the second addition of potassium persulfate was set as 3.5 g, 2.5 g, 2 g, and 3.5 g in Examples 11 to 14, respectively, and the make-up of the water-soluble polymer was changed as shown in Table 1. Each evaluation was performed in the same way as in Example 1. The results are shown in Table 1.

Comparative Examples 1 to 4

A water-soluble polymer, a particulate polymer, a composition for a functional layer, a functional layer-equipped separator, a positive electrode, a negative electrode, and a secondary battery were produced in the same way as in Example 1 with the exception that the make-up of the water-soluble polymer was changed as shown in Table 1. Each evaluation was performed in the same way as in Example 1. The results are shown in Table 1.

In Table 1, shown below:
"TFEMA" indicates 2,2,2-trifluoroethyl methacrylate unit;
"AAm" indicates acrylamide unit;
"AMA" indicates allyl methacrylate unit;
"AA" indicates acrylic acid unit; and
"MAA" indicates methacrylic acid unit.

TABLE 1

| | | | | | Example 1 | Example 2 | Example 3 | Example 4 | Example 5 | Example 6 | Example 7 | Example 8 | Example 9 |
|---|---|---|---|---|---|---|---|---|---|---|---|---|---|
| Binder composition | Water-soluble polymer | Make-up | Fluorine-containing (meth)acrylic acid ester monomer unit | Type | TFEMA | TFEMA | TFEMA | TFEMA | TFEMA | TFEMA | TFEMA | TFEMA | TFEMA |
| | | | | Percentage content [mass %] | 2.5 | 0.1 | 8.0 | 2.5 | 2.5 | 2.5 | 2.5 | 2.5 | 2.5 |
| | | | (Meth)acrylamide monomer unit | Type | AAm | AAm | AAm | AAm | AAm | AAm | AAm | AAm | AAm |
| | | | | Percentage content [mass %] | 85 | 85 | 85 | 76 | 94 | 85 | 85 | 85 | 85 |
| | | | Crosslinkable monomer unit | Type | AMA | AMA | AMA | AMA | AMA | — | AMA | AMA | AMA |
| | | | | Percentage content [mass %] | 0.3 | 0.3 | 0.3 | 0.3 | 0.3 | — | 0.1 | 0.7 | 0.3 |
| | | | Hydrophilic group-containing monomer unit | Type | AA | AA | AA | AA | AA | AA | AA | AA | AA |
| | | | | Percentage content [mass %] | 12.2 | 14.6 | 6.7 | 21.2 | 3.2 | 12.5 | 12.4 | 11.8 | 12.2 |
| | | Degree of swelling in electrolyte solution [factor] | | | 1.6 | 1.6 | 1.8 | 2.2 | 1.3 | 1.7 | 1.6 | 1.5 | 1.5 |
| | | Contact angle with water [°] | | | 58 | 42 | 72 | 51 | 62 | 42 | 47 | 71 | 46 |
| | | Weight average molecular weight [—] | | | 870 × $10^3$ | 870 × $10^3$ | 870 × $10^3$ | 870 × $10^3$ | 870 × $10^3$ | 320 × $10^3$ | 460 × $10^3$ | 2900 × $10^3$ | 340 × $10^3$ |
| Composition for functional layer | Stability | | | | A | A | B | B | A | B | B | B | B |
| Functional layer | Peel strength | | | | A | A | B | A | A | A | A | A | A |
| | Water content | | | | A | B | A | A | A | B | B | A | B |
| | Durability in electrolyte solution | | | | A | A | A | B | B | B | B | A | A |
| Secondary battery | Output characteristics | | | | A | A | B | A | B | A | A | B | A |
| | Cycle characteristics | | | | A | B | A | A | A | B | B | A | B |

| | | | | | Example 10 | Example 11 | Example 12 | Example 13 | Example 14 | Comparative Example 1 | Comparative Example 2 | Comparative Example 3 | Comparative Example 4 |
|---|---|---|---|---|---|---|---|---|---|---|---|---|---|
| Binder composition | Water-soluble polymer | Make-up | Fluorine-containing (meth)acrylic acid ester monomer unit | Type | TFEMA | — | — | — | — | — | — | TFEMA | TFEMA |
| | | | | Percentage content [mass %] | 2.5 | — | — | — | — | — | — | 7.5 | 23 |
| | | | (Meth)acrylamide monomer unit | Type | AAm | AAm | AAm | AAm | AAm | AAm | AAm | AAm | AAm |
| | | | | Percentage content [mass %] | 85 | 86.2 | 89.3 | 84 | 80 | 85 | 55 | 55 | 60.5 |
| | | | Crosslinkable monomer unit | Type | AMA | AMA | AMA | AMA | — | — | — | — | AMA |
| | | | | Percentage content [mass %] | 0.3 | 0.1 | 0.2 | 0.1 | — | — | — | — | 1.5 |
| | | | Hydrophilic group-containing monomer unit | Type | AA | AA | AA | AA | AA | AA | MAA | MAA | AA |
| | | | | Percentage content [mass %] | 12.2 | 13.7 | 10.5 | 15.9 | 20 | 15 | 45 | 37.5 | 15 |
| | | Degree of swelling in electrolyte solution [factor] | | | 1.4 | 1.5 | 2 | 2.5 | 2.8 | 1.4 | 3.3 | 4.2 | 1.6 |
| | | Contact angle with water [°] | | | 67 | 41 | 45 | 46 | 41 | 25 | 28 | 42 | 94 |
| | | Weight average molecular weight [—] | | | 2800 × $10^3$ | 870 × $10^3$ | 3500 × $10^3$ | 4000 × $10^3$ | 1000 × $10^3$ | 850 × $10^3$ | 880 × $10^3$ | 630 × $10^3$ | 550 × $10^3$ |
| Composition for functional layer | Stability | | | | A | B | B | B | B | A | B | B | D |
| Functional layer | Peel strength | | | | A | A | B | A | B | B | B | B | D |
| | Water content | | | | A | B | B | B | B | C | C | B | A |
| | Durability in electrolyte solution | | | | A | A | A | A | C | A | C | D | B |

TABLE 1-continued

| Secondary battery | Output characteristics | B | B | B | B | B | B | A | A | A |
|---|---|---|---|---|---|---|---|---|---|---|
| | Cycle characteristics | A | B | B | B | B | C | C | C | B |

In Examples 1 to 14 in which a binder composition that contained a water-soluble polymer having a contact angle with water of at least 40° and not more than 80° and a degree of swelling in electrolyte solution of more than a factor of 1.0 and not more than a factor of 3.0 was used, a composition for a functional layer having excellent stability, a functional layer having excellent peel strength, excellent durability in electrolyte solution, and reduced water content, and a secondary battery having excellent output characteristics and cycle characteristics were obtained as indicated in Table 1. In Comparative Example 1 in which a binder composition that contained a water-soluble polymer having a contact angle with water of less than 40° was used, water content of a functional layer increased and cycle characteristics of a secondary battery deteriorated as indicated in Table 1. In Comparative Example 2 in which a binder composition that contained a water-soluble polymer having a contact angle with water of less than 40° and a degree of swelling in electrolyte solution of more than a factor of 3.0 was used, water content of a functional layer increased, durability of the functional layer in electrolyte solution decreased, and cycle characteristics of a secondary battery deteriorated as indicated in Table 1. In Comparative Example 3 in which a binder composition that contained a water-soluble polymer having a degree of swelling in electrolyte solution of more than a factor of 3.0 was used, durability of a functional layer in electrolyte solution decreased and cycle characteristics of a secondary battery deteriorated as indicated in Table 1. In Comparative Example 4 in which a binder composition that contained a water-soluble polymer having a contact angle with water of more than 80° was used, stability of a composition for a functional layer decreased as indicated in Table 1. Moreover, peel strength of a functional layer decreased in Comparative Example 4 as a result of the percentage content of a fluorine-containing (meth)acrylic acid ester monomer unit in the water-soluble polymer being high.

INDUSTRIAL APPLICABILITY

According to the present disclosure, it is possible to provide a binder composition for a non-aqueous secondary battery functional layer that enables production of a composition for a non-aqueous secondary battery functional layer that has excellent stability and can cause a non-aqueous secondary battery to display excellent cycle characteristics.

Moreover, according to the present disclosure, it is possible to provide a composition for a non-aqueous secondary battery functional layer that has excellent stability and can cause a non-aqueous secondary battery to display excellent cycle characteristics.

Furthermore, according to the present disclosure, it is possible to provide a functional layer for a non-aqueous secondary battery and a battery member for a non-aqueous secondary battery that can cause a non-aqueous secondary battery to display excellent cycle characteristics, and a non-aqueous secondary battery including the functional layer for a non-aqueous secondary battery.

The invention claimed is:

1. A binder composition for a non-aqueous secondary battery functional layer comprising:
   a water-soluble polymer; and
   water, wherein
   the water-soluble polymer has a contact angle with water of at least 40° and not more than 80°,
   the water-soluble polymer has a degree of swelling in electrolyte solution of more than a factor of 1.0 and not more than a factor of 3.0, and
   the water soluble polymer includes at least 0.1 mass % and not more than 1.0 mass % of allyl methacrylate unit.

2. The binder composition for a non-aqueous secondary battery functional layer according to claim 1, wherein
   the water-soluble polymer includes at least 0.1 mass % and not more than 20 mass % of a fluorine-containing (meth)acrylic acid ester monomer unit.

3. The binder composition for a non-aqueous secondary battery functional layer according to claim 1, wherein
   the water-soluble polymer includes at least 70 mass % and not more than 95 mass % of a (meth)acrylamide monomer unit.

4. The binder composition for a non-aqueous secondary battery functional layer according to claim 1, wherein the water-soluble polymer has a weight average molecular weight of at least 100,000 and not more than 10,000,000.

5. A composition for a non-aqueous secondary battery functional layer comprising:
   non-conductive particles; and
   the binder composition for a non-aqueous secondary battery functional layer according to claim 1.

6. A functional layer for a non-aqueous secondary battery formed using the composition for a non-aqueous secondary battery functional layer according to claim 5.

7. A battery member for a non-aqueous secondary battery comprising the functional layer for a non-aqueous secondary battery according to claim 6.

8. A non-aqueous secondary battery comprising the functional layer for a non-aqueous secondary battery according to claim 6.

* * * * *